(12) United States Patent
Zamora-McKelvy et al.

(10) Patent No.: US 6,496,838 B1
(45) Date of Patent: Dec. 17, 2002

(54) DATABASE RECONCILIATION METHOD AND SYSTEM

(75) Inventors: Michele Zamora-McKelvy, Parker, CO (US); Bryan Stroble, Aurora, CO (US); C. Marlon D. Buggs, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/476,597

(22) Filed: Dec. 31, 1999
(Under 37 CFR 1.47)

(51) Int. Cl.⁷ .............................................. G06F 17/30
(52) U.S. Cl. ...................................................... 707/201
(58) Field of Search ................................ 395/335, 161; 364/300, 900; 707/10, 201

(56) References Cited

U.S. PATENT DOCUMENTS

| | | | |
|---|---|---|---|
| 4,432,057 A | * | 2/1984 | Daniell et al. ............... 364/300 |
| 4,807,182 A | * | 2/1989 | Queen ......................... 364/900 |
| 4,866,611 A | * | 9/1989 | Cree et al. ................... 364/300 |
| 5,392,390 A | * | 2/1995 | Crozier ........................ 395/161 |
| 5,684,990 A | * | 11/1997 | Boothby ...................... 395/619 |
| 5,701,423 A | * | 12/1997 | Crozier ........................ 395/335 |
| 6,243,705 B1 | * | 6/2001 | Kucala ........................ 707/10 |

* cited by examiner

Primary Examiner—Wayne Amsbury
Assistant Examiner—Cam-Linh Nguyen
(74) Attorney, Agent, or Firm—Marsh Fischmann & Breyfogle LLP (57) ABSTRACT

The present invention discloses a method and system for use in reconciling a first record, which may be selected from a plurality of first records, with a matching record included in a plurality of second records. The first records may comprise a first database and the second records may comprise a second database, or the first records and second records may comprise separate tables within the same database. A search of the second records for records possibly matching the first record is performed. The search may be performed by comparing data within progressively smaller sets of query fields comprised of data fields of the first record to data within corresponding progressively smaller sets of search fields comprised of data fields of the second records. For each pair of query and search field sets, the search generates a set of suggested matching records, which may be empty. The first record and the sets of suggested matching records are then displayed together on a first interface. With the first record and suggested matching records thus displayed, the suggested matching records may be easily reviewed and compared with the first record to determine if any of the suggested records match the first record. If so, data from a predetermined field of the matching record may be copied into a predetermined field of the first record to complete reconciliation of the records.

21 Claims, 9 Drawing Sheets

Fig. 1

| FIELD NAME | FIELD DEFINITION |
|---|---|
| ListingID | Listing identification number. |
| Metroname | Book in which the ad appears. |
| Heading | Heading under which this ad appears. |
| Telephone | Customer's main telephone number. |
| Customer Name | Name of company placing the advertisement. |
| Address | Address given when placing the ad. (Street, City, State & Zip code). |
| PhoneMetroFeatureHeading | Listing of all files known with the same phone number, metro name, feature, and heading. |
| PhoneMetroFeature | Listing of all files known with the same phone, metro, and feature. |
| PhoneNoArea | Phone number for listing without area code. |
| ListingSalesEvent | Flag for Listing sales event. |
| ListingDeleteFlag | Listing delete flag. |
| ListingStartDate | Date the listing begins in the book. |
| ListingStopDate | Date the Listing stops in the book. |
| Solomonordernbr | Order number for this listing in Solomon Accounting program. |
| FeatureSalesEvent | Flag for feature sales event. |
| Featuretype | Type of feature ordered, such as, Link, InfoPage, etc. |
| FeatureURL | Universal Resource Locator address for InfoPage or Web page ordered. |
| FeatureDeleteFlag | Feature delete flag. |
| FeatureStartDate | Date the ordered feature is to begin. |
| FeatureStopDate | Date the ordered feature is to end. |

Fig. 2A

| FIELD NAME | FIELD DEFINITION |
|---|---|
| Phone | Phone number of listing company. |
| Company | Company name of customer. |
| Feature | Type of feature ordered. |
| SurrArea | Surrounding Area. |
| Heading | Yellow page heading used in this advertisement. |
| FD97ID | FileMaker97 unique ID number. |
| CustomerID | Unique record identification number (Phone number). |
| SurrAreaFixed | Surrounding Area. |
| Heading2 | Heading for Advertisement. |
| DateIN | Date Order was entered. |
| BillingAddress | Billing address street. |
| Billingcity | Billing address City. |
| State | Billing Address State. |
| Zip | Billing address Zip code. |
| Feature | Type of feature ordered. |
| SurrArea | Surrounding area. |
| Start | Start date of feature. |
| End | End date of feature. |
| PhoneNoArea | Customer phone number without Area Code. |
| CustIDSurrFeatureHeading | Customer ID Surrounding Area, Feature type, heading. |
| CustIdSurrFeature | Customer ID, Surrounding Area, Feature type. |
| CustIDSurr | Customer ID, Surrounding Area. |
| Gif Name2 | Replica file name. |

| Customer Name | Telephone | Metroname | Feature Type | Heading | Feature Start Date | Feature Stop Date |
|---|---|---|---|---|---|---|
| Company X | 3038617000 | Denver | HOMEPG | Attorneys | | |
| Company W | 3037921421 | Denver | HOMEPG | Rental Service | | |
| Company V | 3037926000 | Denver | HOMEPG | Television Repair | | |
| Company U | 3038669999 | Boulder | INFOPG | Computers | | |
| Company T | 3038664241 | Boulder | HOMEPG | Pet Supplies | | |

| Company | Phone | SurrArea | Feature | Heading | Start | End | FD97ID |
|---|---|---|---|---|---|---|---|
| Company T | 3038664241 | Boulder | HOMEPG | | 4/1/96 | 4/1/97 | 62 |
| Company U | 3038669999 | Boulder | INFOPG | Computers | 10/1/96 | 10/1/97 | 75 |
| | 3037921421 | Denver | HOMEPG | Rental Service | 11/1/96 | 11/1/97 | 97 |
| Company X | 3038617000 | Denver | HOMEPG | | 10/30/96 | 10/30/97 | 70 |
| Company V | 3037926000 | Denver | | | 1/1/96 | 1/1/97 | 102 |

DATABASE RECONCILIATION METHOD AND SYSTEM

FIELD OF THE INVENTION

The present invention generally relates to databases, and, more particularly, is concerned with reconciling records maintained in two separate databases or in separate tables within the same database.

BACKGROUND OF THE INVENTION

Records maintained in two separate databases or in separate tables within the same database may contain related information. For example, a provider of a web-based telephone directory listing service may have developed a first database that includes records containing information relating to orders placed by customers for listings in the web-based telephone directory service. The first database might include records having data fields for customer names, addresses, phone numbers, and other information about the customer's advertisement order. For example, the data in the fields of a particular record in the first database may identify "Company X" as having an address of "1700 Lincoln Street, Denver Colo.," and a phone number of "3038617000." The provider might also have developed a second database that includes records relating to the features of ordered advertisements in the web-based telephone directory listings. The second database might include records having data fields for customer names, addresses, and phone numbers as well as the type of feature ordered, such as a link to the customer's home page or an information page about the customer, and start and end dates for the advertisement. For example, the data in the fields of a particular record in the second database may indicate that customer "Company X" located at "1700 Lincoln Street" in "Denver, Colo." has ordered an advertisement that is to start on "10/30/96" and end on "10/30/97" and the advertisement includes a link to the customer's home web page. Since databases such as described above typically have numerous records, verifying that the data within a record within the first database is consistent with the data in a related record within the second databases may be a difficult and time consuming process.

SUMMARY OF THE INVENTION

The inventors of the present invention have recognized that verification of data contained within related, but separately maintained records may be facilitated by providing a method and system for identifying matching records and ensuring that the identified matching records are made consistent (i.e. reconciled).

Accordingly, one object of the present invention is to provide a method and system that facilitates the identification of matching records maintained in separate databases or in separate tables within the same database, such as, for example, matching records maintained in a first database relating to orders for web-based telephone directory listings with records maintained in a second database relating to the features of the ordered listings.

Another object of the present invention is to provide a method and system that permits identified matching records to be easily reconciled by including the same data in the matching records, such as, for example, data comprising a unique identification number.

These and other objectives and advantages are achieved by the method and system of the present invention. The present invention discloses a method and system for use in reconciling a first record, which may be selected from a plurality of first records, with a matching record included in a plurality of second records. The first records and second records may be maintained separately, such as in separate databases or in separate tables within the same database. The disclosed method and system facilitates identification of matching records by searching the second records for records that are possible matches for the first record. The possible matching records, if any, found in the plurality of second records may then be displayed together with the first record. This permits the suggested matching records to be easily compared with the first record, and if a matching record is identified, data from a predetermined field of the identified matching record may be copied to a predetermined field of the first record to reconcile the first record with its matching record from the plurality of second records.

In one aspect of the present invention, a method for use in reconciling database records includes the step of identifying at least one first record from a plurality of first records to reconcile with a plurality of second records. The first records include data within a plurality of first data fields and the second records include data within a plurality of second data fields. The method also includes the steps of identifying a predetermined number of query fields comprised of first data fields and identifying the same number of search fields comprised of second data fields. Each search field identified corresponds with a separate query field. A search of the second records for records that are possible matches for the first record is then performed. In the search, data within progressively smaller sets of the query fields is compared to data within corresponding progressively smaller sets of the search fields. For each corresponding query and search field set, the searching step generates a set of suggested matching records comprised of the second records wherein the data within each search field matches the data within each corresponding query field. For example, data within first, second, third, and fourth query field sets comprised of M, N, O, and P query fields, respectively, may be compared to data within first, second, third, and fourth search field sets comprised of M, N, O, and P search fields, respectively, wherein M represents a positive integer (e.g. 4), N represents a positive integer less than M (e.g. 3), O represents a positive integer less than N (e.g. 2), and P represents a positive integer less than O (e.g. 1). It should be appreciated that the possibility exists that a set of suggested matching records may be an empty set if no second records are found having data within the particular search field set that matches data within the corresponding query field set. It should also be noted that the query and search field sets used need not be progressively smaller by the same number of elements.

In another embodiment, the method of the present invention includes the step of displaying the first record and the sets of suggested matching records together on a first interface wherein the records within the sets of suggested matching records are reviewable to determine whether one of the records in the sets of suggested matching records matches the first record. Displaying the first record and the sets of suggested matching records together facilitates comparison of the suggested matching records with the first record. In this regard, the number of data fields for which data is displayed for each suggested matching record may be less than the total number of data fields of the second records thereby further easing comparison of the suggested matching records with the first record. As to review of the suggested matching records, a suggested matching record may be determined to be a match for the first record when, for example, all of the displayed data of the suggested matching record is the same as the data displayed for the first record. It should be appreciated that a record included in a set of suggested matching records generated by comparing data within larger query and search field sets may more likely be a match for the first record than a record included in a set of suggested records generated by comparing data within smaller query and search field sets because such a record has already been found to have matching data within more data fields. Thus, it may be advantageous to review records within sets of suggested matching records generated by comparing data within larger query and search field sets prior to those within sets generated by comparing data within smaller query and search field sets.

In a further embodiment, the method of the present invention includes the step of receiving an input from a user identifying a record from the sets of suggested matching records that matches the first record. The first record and its identified matching record from the second records may then be reconciled by copying data from a predetermined data field of the identified matching record to a predetermined data field of the first record. In the event that no matching record is found in the sets of suggested matching records, an input from the user indicating such may be received. Upon receipt of an input indicating that no matching record was found in the sets of suggested matching records, a second interface may be displayed wherein the user may execute a manual search for records in the second database that match the first record using at least one user specified query term.

According to an additional aspect of the present invention, one embodiment of a database reconciliation system includes a first record having data within a first plurality of data fields, a plurality of second records having data within a second plurality of data fields, a predetermined number of query fields comprised of first data fields, a predetermined number of search fields comprised of second data fields, and a processing apparatus capable of accessing the first record and the second records. The first record may be one of a plurality of first records. Furthermore, the first records may comprise a first database and the second records may comprise a second database, or the first records and the second records may comprise separate tables within the first database. The number of search fields is the same as the number of query fields and each search field corresponds with a separate query field. The processing apparatus may, for example, be a computer. The first record and the second records may be accessible to the processing apparatus locally or through a data network, such as, for example, a local area network.

The processing apparatus provides for searching of the second records for records that are possible matches for the first record by comparing data within progressively smaller sets of query fields to data within corresponding progressively smaller sets of search fields. For each corresponding set of query and search fields, the search generates a set of suggested matching records comprised of the second records having data within the search fields matching data within the query fields. For example, the processing apparatus may provide for searching of the second records for records that are possible matches for the first record by comparing data within first, second, third, and fourth query field sets to data within first, second, third, and fourth search field sets. The first, second, third, and fourth query field sets may be comprised of M, N, O, and P query fields, respectively, and the first, second, third, and fourth search field sets may be comprised of M, N, O, and P search fields, respectively, wherein M represents a positive integer (e.g. 4), N represents a positive integer less than M (e.g. 3), O represents a positive integer less than N (e.g. 2), and P represents a positive integer less than O (e.g. 1).

In another embodiment of the system of the present invention, the processing apparatus also provides for display of the selected record and the sets of suggested matching records together on a first interface. This permits a user of the system to easily compare the suggested matching records with the first record in order to determine whether one of the suggested matching records matches the first record. In this regard, the processing apparatus may provide for display of data within a number of predetermined data fields for each suggested matching record that is less than the total number of data fields in the suggested matching record.

In a further embodiment, the processing apparatus further provides for receipt of an input from a user of the system identifying a record from the sets of suggested matching records that matches the first record, and copying of data from a predetermined data field of the identified record to a predetermined data field of the first record. As may be appreciated, with data from the predetermined data field of the identified matching record copied into the predetermined data field of the first record, the first record is reconciled with its matching record in the plurality of second records.

In an additional embodiment of the system of the present invention, the processing apparatus provides for receipt of an input from a user of the system indicating that the user has not found a record within the sets of suggested matching records that matches the first record. Upon receipt of an input indicating that no matching record has been found, the processing apparatus may provide for execution of a manual search for records in the second plurality of records that match the first record using at least one query term input by the user.

These and other aspects and advantages of the present invention should become apparent from a review of the following detailed description when taken in conjunction with the accompanying figures.

DETAILED DESCRIPTION

Figure 1:
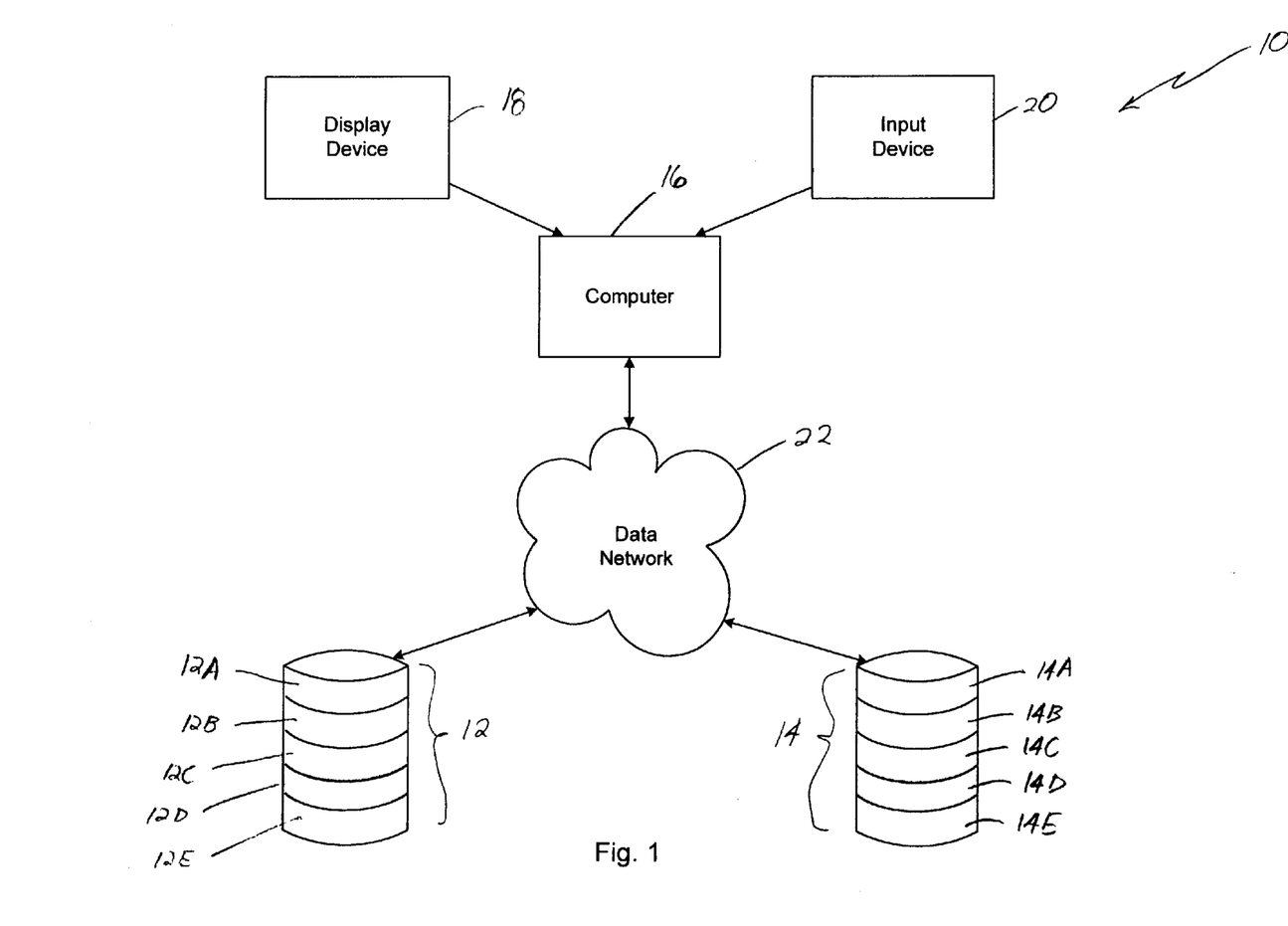
FIG. 1 presents a block diagram of one embodiment of a database reconciliation system in accordance with the present invention.

FIG. 1 presents a block diagram of one embodiment of a database reconciliation system 10 in accordance with the present invention. The system 10 includes a plurality of first records 12A–12E and a plurality of second records 14A–14E. The plurality of first records 12A–12E may comprise a first database 12. The plurality of second records 14A–14E may comprise a second database 14. In the illustrated embodiment, the databases 12, 14 both have five records. However, it should be appreciated that there may be as few as one record and, typically, there may be many more than five records in the databases 12, 14. Further, although not illustrated, the plurality of first records 12A–12E and the plurality of second records 14A–14E may comprise separate tables within the same database. The system 10 further includes a processing apparatus, such as, for example, a computer 16. The system 10 may also include a display device 18 (e.g., a monitor) in communication with the computer 16, and an input device 20 (e.g., a mouse and/or keyboard) in communication with the computer 16. The computer 16 is capable of accessing the first and second databases 12, 14 either directly (e.g. when one or both of the databases 12, 14 are on a local hard drive), or as is illustrated, via a data network 22 (e.g. when one or both of the databases 12, 14 are on network hard drives).

The database reconciliation system 10 is for use in identifying and reconciling matching records maintained within the first and second databases 12, 14. Using the input device 20, a user of the system 10 may select one of the first records 12A–12E to reconcile with the second records 14A–14E. For example, the user may select first record 12A. As will be described in more detail below, the processing apparatus searches the plurality of second records 14A–14E for records possibly matching the selected first record 12A. The search generates sets of suggested matching records for the selected first record 12A. The selected first record 12A and the sets of suggested matching records are then displayed together on the display device 18. This allows the user of the system 10 to easily review and compare the selected first record 12A with each suggested matching record in order to identify a matching record, if any, for the first record 12A from among the sets of suggested matching records. Once a matching record, if any, is identified, data may be copied from a predetermined data field of the identified matching record and pasted into a predetermined data field of the selected first record 12A in order to reconcile the selected first record 12A with its matching record from the second records 14A–14E.

Figure 2A:
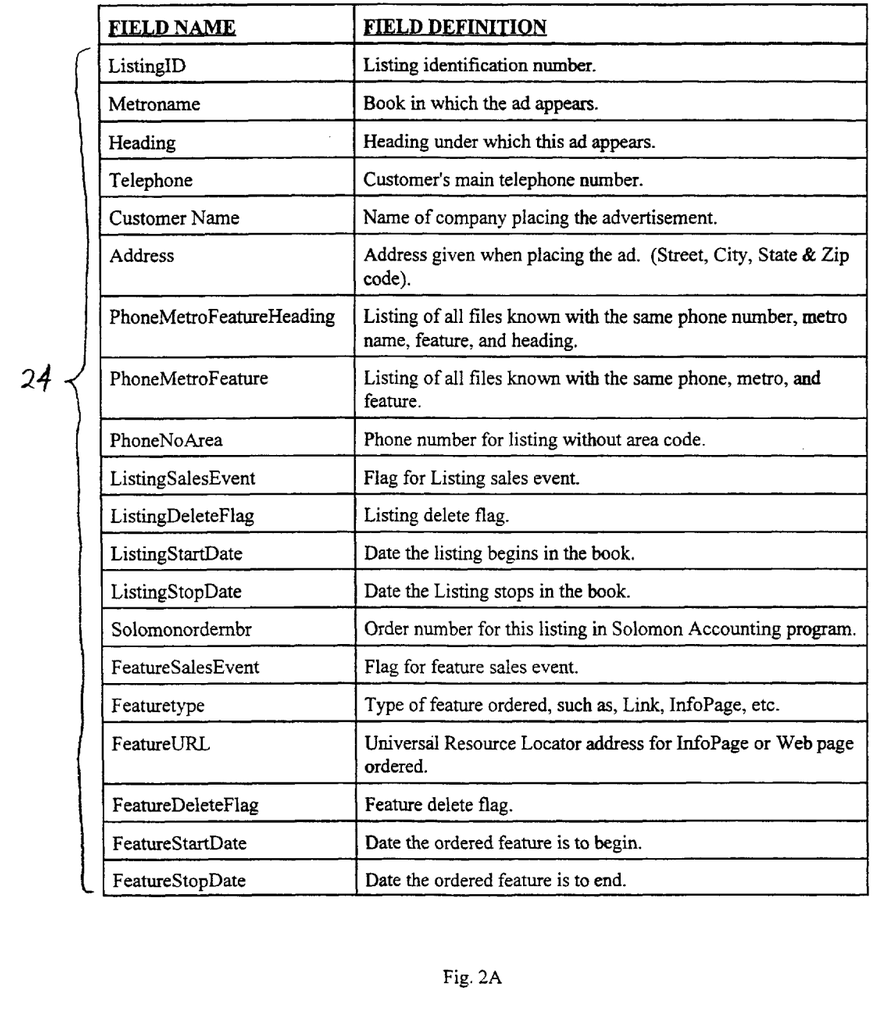
FIGS. 2A–B list the names of the data fields and associated field definitions for exemplary first and second databases, respectively, in one embodiment of a database reconciliation system in accordance with the present invention.
Figure 2B:
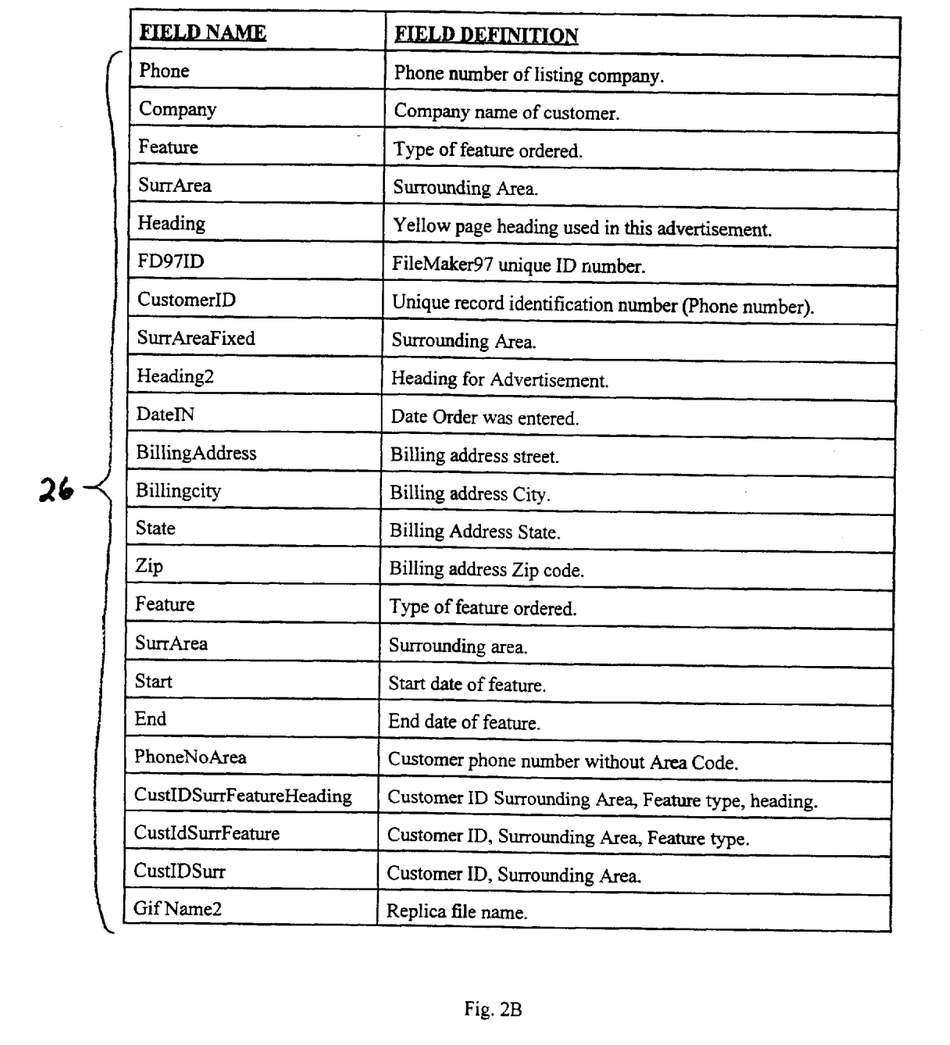

FIGS. 2A–B list the names of data fields 24, 26 and their associated field definitions for exemplary first and second databases 12, 14, respectively. In the embodiment described herein, the first and second databases 12, 14 include pluralities of records relating to telephone directory listings ordered by customers of an on-line telephone directory provider, but it should be appreciated that the system 10 of the present invention is generally applicable for use in identifying and reconciling corresponding records within any two databases. As can be seen by comparing the definitions of the data fields 24, 26 listed in FIGS. 2A and 2B, several of the data fields 24, 26 within each database may contain corresponding data. For example, the "Telephone", "Metroname", "FeatureType", "Heading", and "PhoneNoArea" fields 24 in the first database 12 may correspond, respectively, with the "Phone", "SurrArr", "Feature", "Heading", and "PhoneNoArea" fields 26 in the second database 14. Furthermore, some fields may be concatenations of other fields. For example, the "PhoneMetroFeatureHeading" field 24 in the first database 12 is a concatenation of the "Telephone", "Metroname", "FeatureType", and "Heading" fields 24 in the first database 12.

Figure 3A:
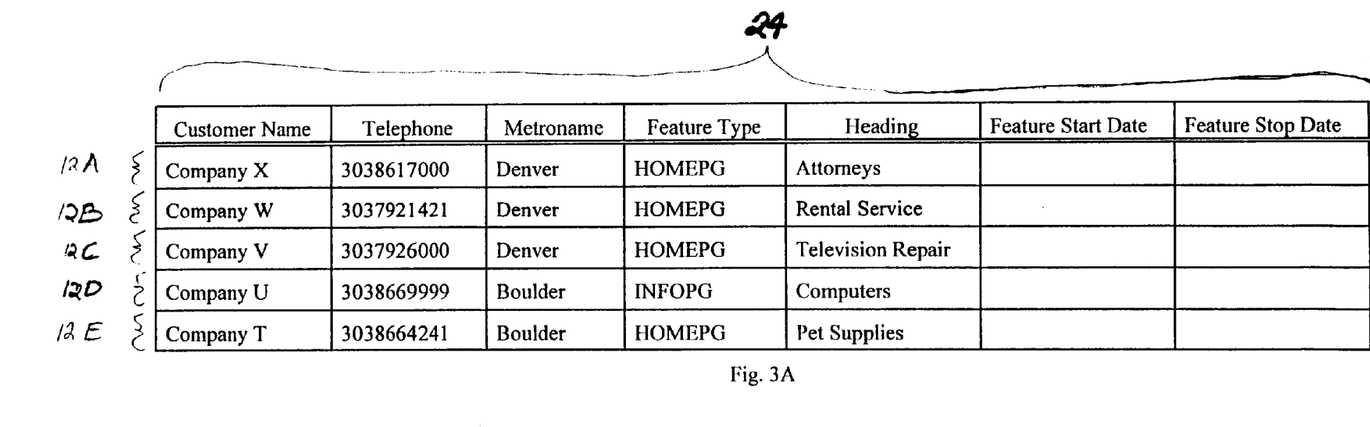
FIGS. 3A–B illustrate exemplary corresponding first and second records within exemplary first and second databases in a table format.
Figure 3B:
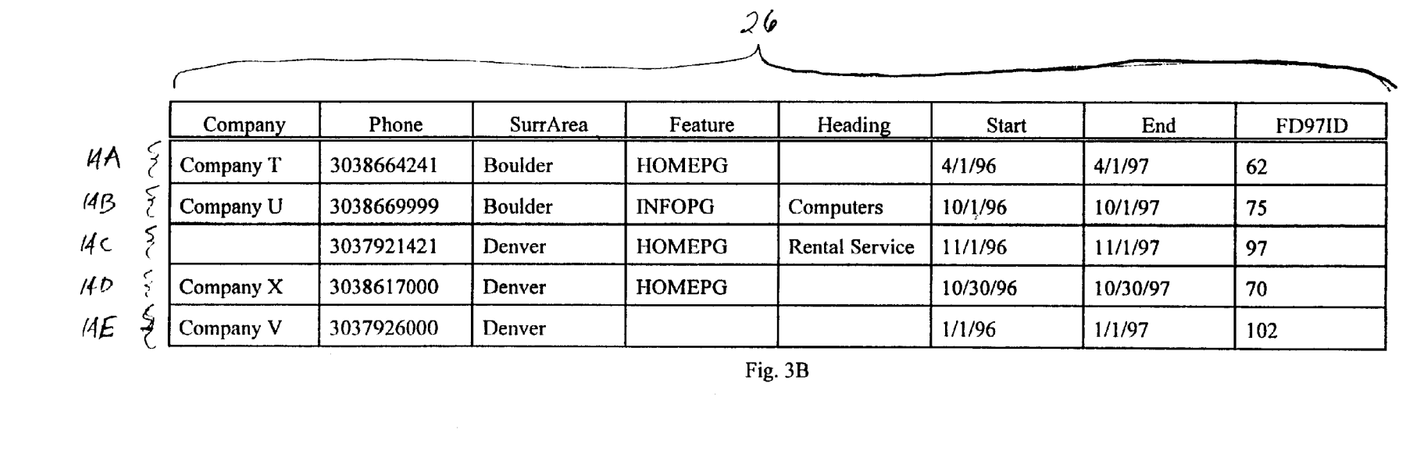

FIGS. 3A–B show data from exemplary corresponding first and second records 12A–E and 14A–E from the first and second databases 12, 14, respectively, in a table format. The records are illustrated with only selected data fields 24, 26 displayed. As can be seen by comparing the records shown, first record 12A matches second record 14D, first record 12B matches second record 14C, first record 12C matches second record 14E, first record 12D matches second record 14B, and first record 12E matches second record 14A. As can be seen, some of the second records 14A–14E may not have data within all of the displayed data fields 26. For example, second records 14A and 14D have no data in the "Heading" data field 26 and second record 14C has no data in the "Company" data field 26. Likewise, the "FeatureStartDate" and "FeatureStopDate" data fields 14 of the first records 12A–12E have no data therein. As may be appreciated, identifying matching records from among the first and second records 12A–12E and 14A–14E (e.g. identifying record 14D as matching record 12A) may require a comparison of data within one or more data fields 24, 26 of the first and second records 12A–12E and 14A–14E.

Figure 4A:
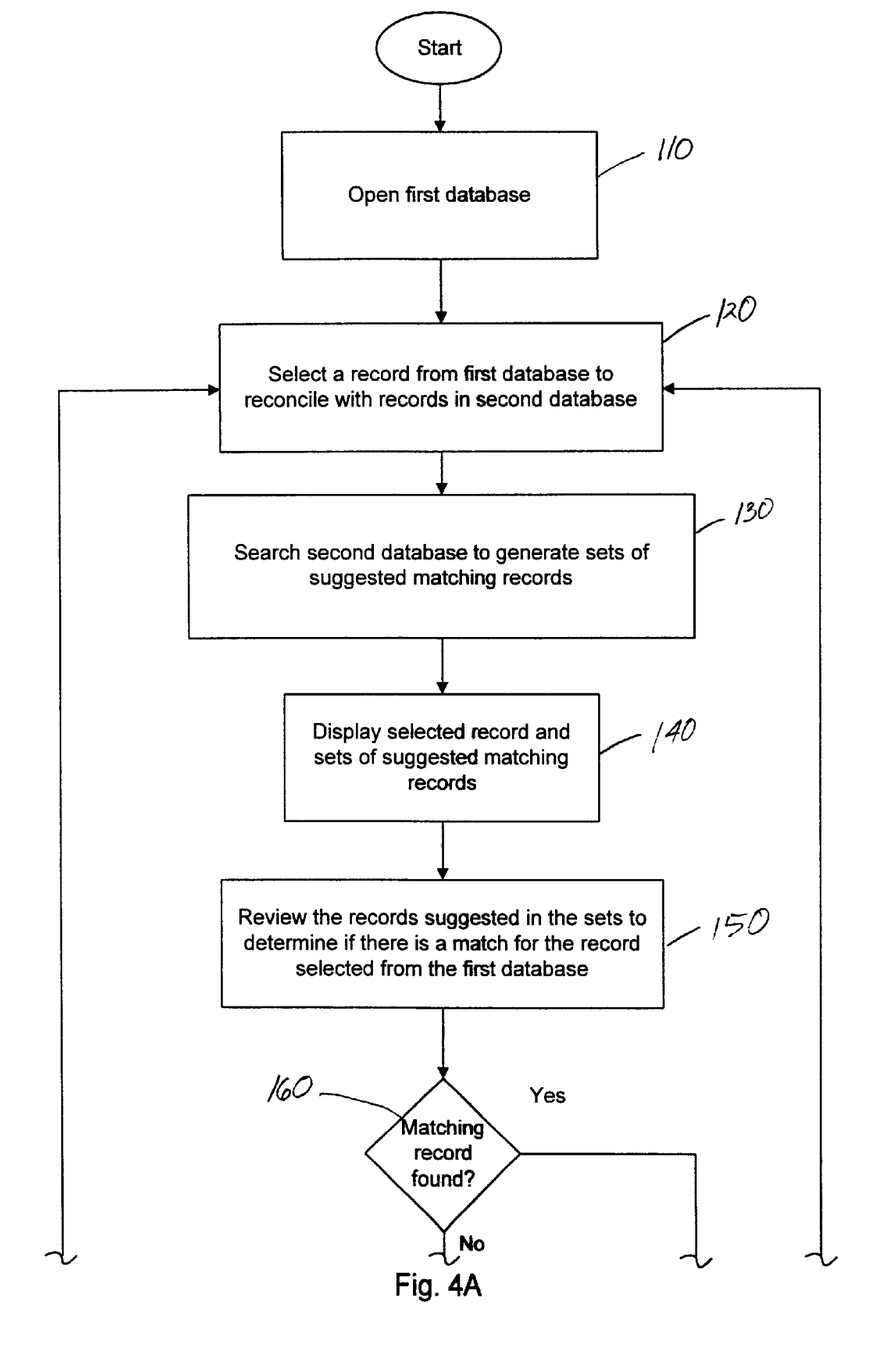
FIGS. 4A–C illustrate the steps in one embodiment of a method in accordance with the present invention for use in reconciling records within a first database with records within a second database.
Figure 4B:
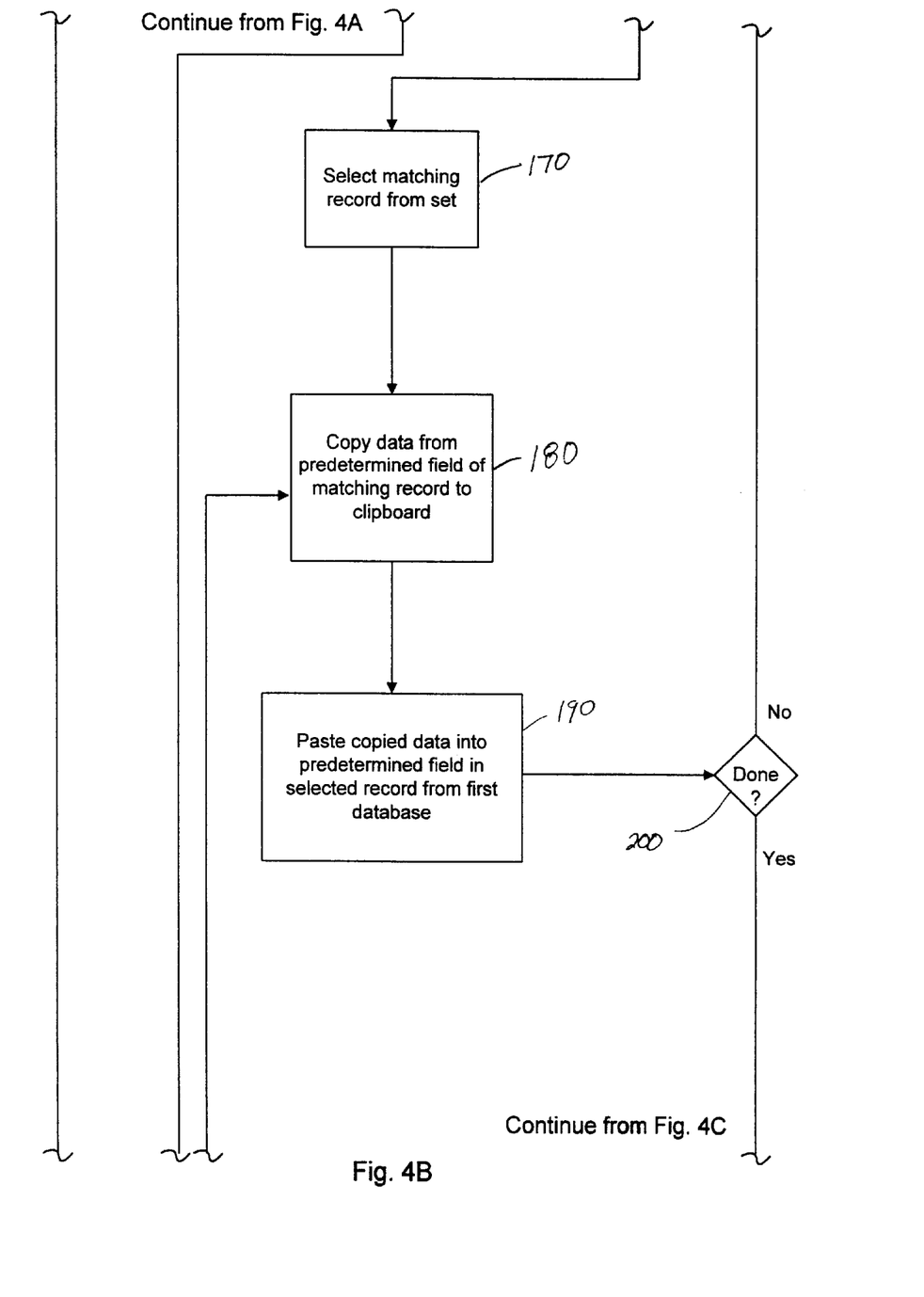
Figure 4C:
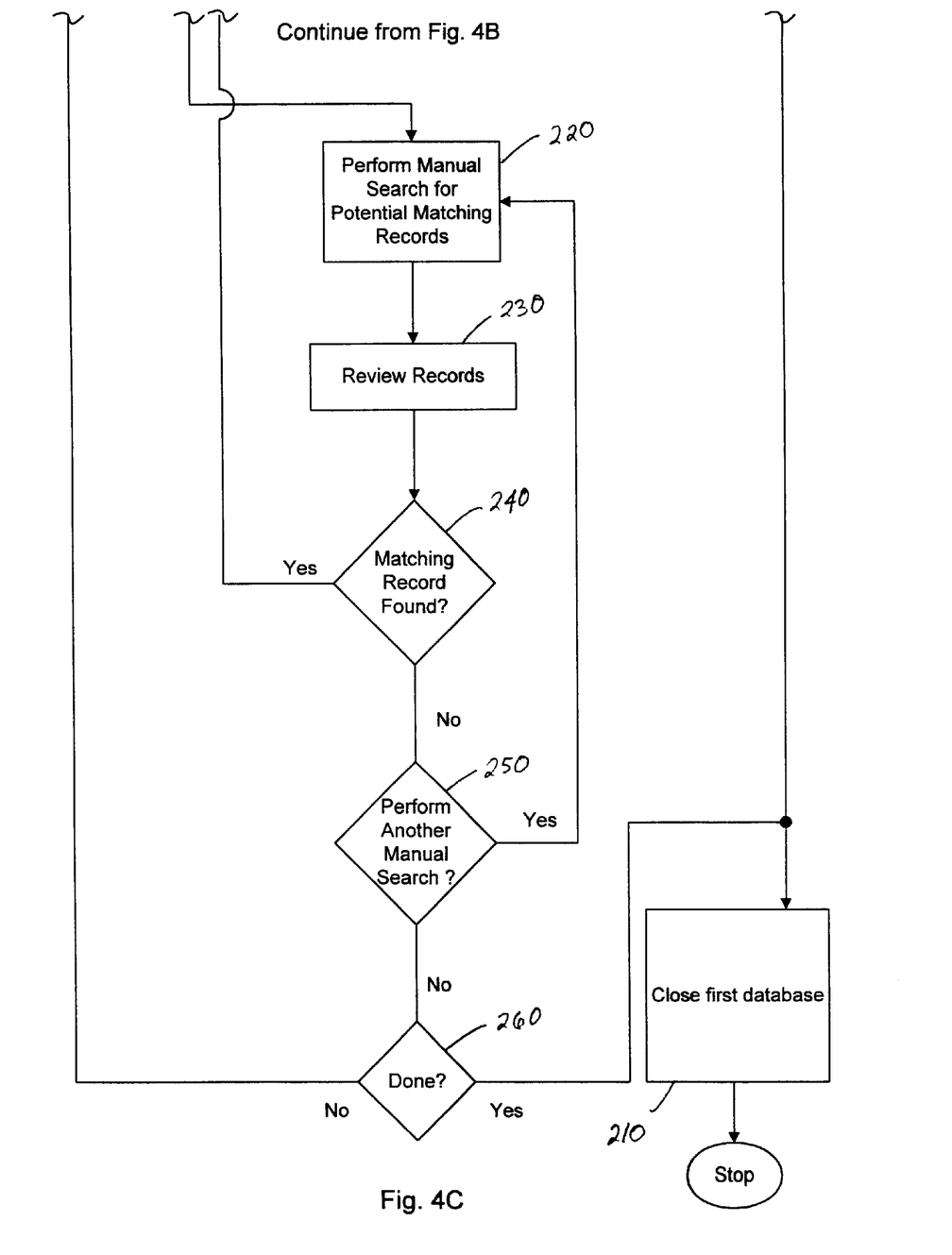

FIGS. 4A–C illustrate the steps undertaken to reconcile records selected from the first database 12 with records from the second database 14 using the database reconciliation system 10. The process begins at step 110 with the user 22 opening the first database 12. In step 110, the user may be prompted by the computer 16 with a list of databases which may be opened as the first database 12. In the embodiment described herein, the first database 12 includes the data fields 24 listed in FIG. 2A.

Figure 5:
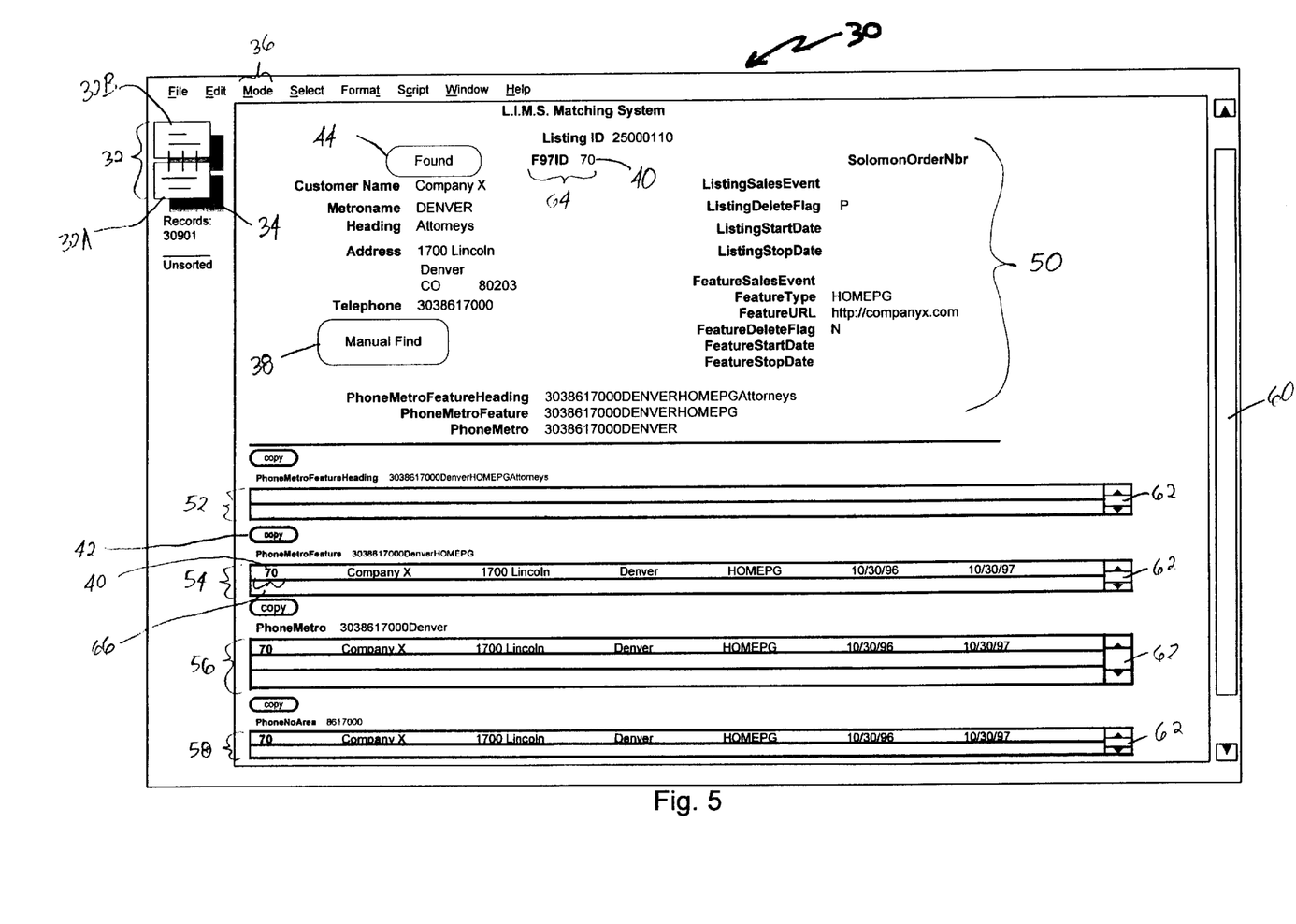
FIG. 5 illustrates an exemplary first interface displayed in the steps of the method illustrated in FIGS. 4A–C.
Figure 6:
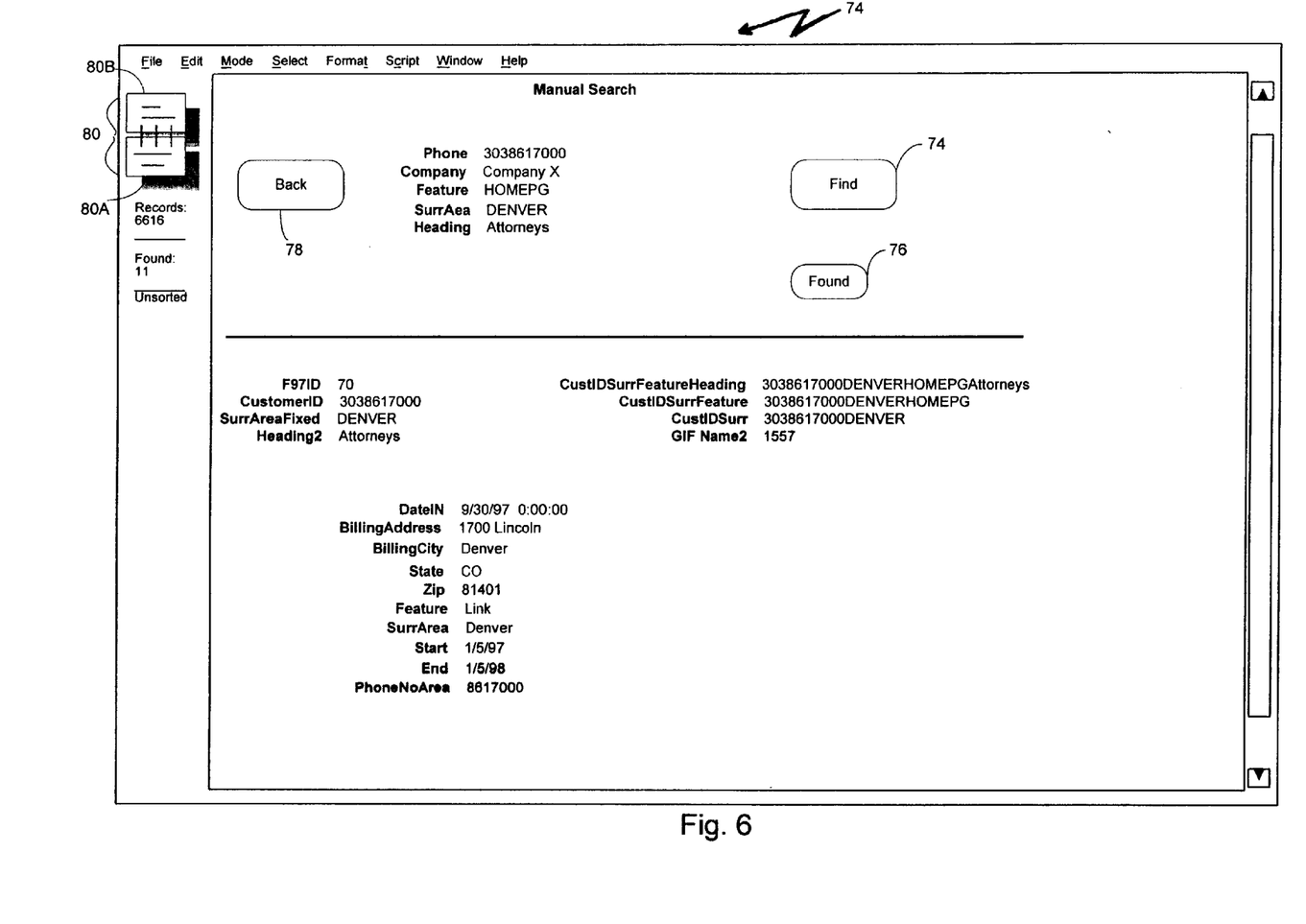
FIG. 6 illustrates an exemplary second interface displayed in the steps of the method illustrated in FIGS. 4A–C.

After the first database 12 is opened, in step 120, the user selects a record from the first database 12 to reconcile with records in the second database 14. Selection of a record from the first database 12 may be accomplished through a first user interface 30 displayed by the computer 16 on the display 18 and input from the user to the computer 16 through the input device 20. FIG. 5 illustrates a typical first user interface 30. Using the illustrated interface 30, the user may select a record from the first database 12 in a number of manners. For example, by clicking on the lower and upper portions 32A, 32B of an icon 32 in the upper left corner of the first user interface 30, the user may move to the next or previous record in the first database 12. The user may also click on the record number 34 displayed adjacent to icon 32 and enter the number of the record that the user wishes to select from the first database 12. Another option is to utilize the "Find" function within the "Mode" pulldown menu 36 to locate a specific record or group of records within the first database 12. The selected record 50 from the first database 12 may be displayed in the upper portion of the first user interface 30. In the illustrated instance, the selected record 50 is first record 12A shown in FIG. 3A.

Once a record is selected from the first database 12 by the user, step 130 is executed. Step 130 may also be performed when the first database 12 is initially opened by the user, with the record that the first database 12 initially opens with serving as the selected record 50. In step 130, the computer 16 searches the second database 14 for records that are possible matches for the selected record 50 by comparing data within progressively smaller sets of query fields to data within corresponding progressively smaller sets of search fields. The query fields comprise a predetermined number of the data fields 24 of the first database 12, and the search fields comprise a predetermined number of the data fields 26 of the second database 14. The number of search fields is the same as the number of query fields, and each search field corresponds with a separate query field. Which search field corresponds to which query field may be known in advance. For each corresponding progressively smaller set of query and search fields, the search generates a set of suggested matching records comprised of records from the second database 14 wherein the data within each search field matches the data within each corresponding query field. If no such records are found for a particular pair of corresponding query and search sets, then the set of suggested matching records generated by the search will be an empty set. When the search is performed in step 130, the identity of the second database 14, which is searched for suggested matching records, may be fixed. Alternatively, there may be a step (not illustrated in FIGS. 3A–C) in addition to steps 110 and 120 before step 130 wherein the user identifies a database to use as the second database 14.

By way of example, the second database 14 may be searched using first, second, third, and fourth corresponding progressively smaller sets of query and search fields. The first set of query fields may be comprised of four data fields 24 of the first database 12, such as the "Telephone", "Metroname", "FeatureType", and "Heading" data fields 24, and the first set of search fields may be comprised of four data fields 26 of the second database 14, such as the "Phone", "SurrArr", "Feature", and "Heading" fields 26. As may be appreciated from the definitions of the data fields 24, 26 given in FIGS. 2A and 2B, the "Telephone" query field corresponds to "Phone" search field, the "Metroname" query field corresponds to the "SurrArr" search field, the "FeatureType" query field corresponds to the "Feature" search field, and the "Heading" query field corresponds to the "Heading" search field. Using the first set of query and search fields, a first set 52 of suggested matching records is generated, wherein the data within the "Telephone" query field matches the data within the "Phone" search field, the data within the "Metroname" query field matches the data within the "SurrArr" search field, the data within the "FeatureType" query field matches the data within the "Feature" search field, and the data within the "Heading" query field matches the data within the "Heading" search field. The second set of query fields may be comprised of three data fields 24 of the first database 12, such as the "Telephone", "Metroname", and "FeatureType" data fields 24, and the second set of search fields may be comprised of three data fields 26 of the second database 14, such as the "Phone", "SurrArr", and "Feature" data fields 26. Using the second set of query and search fields, a second set 54 of suggested matching records is generated, wherein the data within the "Telephone" query field matches the data within the "Phone" search field, the data within the "Metroname" query field matches the data within the "SurrArr" search field, and the data within the "FeatureType" query field matches the data within the "Feature" search field. The third set of query fields may be comprised of two data fields 24 of the first database 12, such as the "Telephone" and "Metroname" data fields 24, and the third set of search fields may be comprised of two data fields 26 of the second database 14, such as the "Phone" and "SurrArr" data fields 26. Using the third sets of query and search fields, a third set 56 of suggested matching records is generated, wherein the data within the "Telephone" query field matches the data within the "Phone" search field, and the data within the "Metroname" query field matches the data within the "SurrArr" search field. The fourth set of query fields may be comprised of one data field 24 of the first database 12, such as the "PhoneNoArea" data field 24, and the fourth set of search fields may be comprised of one data field 26 of the second database 14, such as the "PhoneNoArea" data field 26. Using the fourth set of query and search fields, a fourth set 56 of suggested matching records is generated, wherein the data within the "PhoneNoArea" query field matches the data within the "PhoneNoArea" search field. It will be appreciated that records within the sets of suggested matching records generated using query and search field sets having a greater number of elements are more likely to be a match for the selected record 50 than records within sets generated using query and search field sets having a fewer number of elements (e.g. records from the first set 52 are more likely to be a match for the selected record 50 than records from the second set 52). It should also be appreciated that one or more of the sets of suggested matching records may be empty (as is the illustrated first set 52) if no records are found wherein data within the fields 26 of the search field set matches data within the fields 24 of query field set.

In step 140, the selected record 50 from the first database 12 and the sets 52, 54, 56, 58 of suggested matching records from the second database 14 are displayed together on the first user interface 30. As is illustrated in FIG. 4, the selected record 50 may be displayed in the upper portion of the first user interface 30, and the sets 52, 54, 56, 58 of suggested matching records may be displayed in the lower portion of the first user interface 30. If necessary, a scroll bar 60 may be included in the first user interface 30 so that the user 22 may scroll the interface 30 to make additional sets, if any, visible. In displaying the selected record 50 and the sets 52, 54, 56, 58 of suggested matching records, data within predetermined fields of the selected record 50 and data within predetermined fields of the records in the sets 52, 54, 56, 58 of suggested matching records may be displayed. For example, as is illustrated in FIG. 4, whereas data within all of the fields 24 of the selected record 50 may be displayed (some fields may be empty), only data within the "FD97ID", "Company", "BillingAddress", "BillingCity", "Feature", "Start" and "End" fields 26 may be displayed for records in the sets 52, 54, 56, 58 of suggested matching records. There may also be scroll bars 62 associated with each of the sets 52, 54, 56, 58 that permit the user 22 to scroll through the suggested matching records in each set 52, 54, 56, 58.

In step 150, the user reviews the records in the sets 52, 54, 56, 58 of suggested matching records to determine if any of the suggested records match the selected record 50. Preferably, the user begins by reviewing the suggested records included in the first set 52 since these records were generated using the largest number of data fields 24, 26 and are therefore the most likely matches for the selected record 50. If no matching record is found in the first set 52, or if the first set 52 is empty as is the case in FIG. 4, the user preferably proceeds to review the records suggested in the second set 54 since these are the next most likely matching records. If no matching records are found in the second set 54, the user preferably proceeds to review the records in the third and fourth sets 56, 58, respectively, until a matching record is found or it is determined that there are no matching records in the sets 52, 54, 56, 58 of suggested matching records.

During step 150, the user may apply specified criteria for determining whether one of the suggested matching records is a match for the selected record 50. For example, a suggested record may be considered a match for the selected record 50 if the data within the "Company", "BillingAddress", "BillingCity" and "Feature" fields 26 of the suggested matching record is the same as data in the "Customer Name", "Address" and "FeatureType" fields 24 of the selected record 50. In the example illustrated in FIG. 4, the first set 52 is empty, but second record 14D suggested in each of the second, third and fourth sets 54, 56, 58 is a match for the selected record 50 (first record 12A).

As indicated by step 160, if a matching record is found, step 170 is undertaken, and if no matching records are found in the sets 52, 54, 56, 58 of suggested matching records, step 220 is undertaken.

In step 170, the user selects the matching record from the set in which it was included. Selection of the matching record may be accomplished by clicking on data displayed for a predetermined field 66 of the matching record, such as the data 40 within the "FD97ID" field 26 in the matching record of the second set 54. In step 180, the user copies the data 40 from the predetermined field 66 of the selected matching record to a temporary data buffer (e.g. a clipboard) in the computer 16. This may be accomplished by clicking on the "Copy" icon 42 displayed above the set in which the matching record was found. In step 190, the user pastes the copied data 40 from the temporary data buffer into a predetermined data field 64 of the selected record 50. This may be accomplished by clicking on the "Found" icon 44. Once the data 40 is copied and pasted from the predetermined field 66 of the matching record into the predetermined field 64 of the selected record 50, the selected record from the first database 12 is reconciled with the its matching record in the second database 14 because both the selected record 50 and the matching record include the same data 40 in their respective predetermined data fields 64, 66. As in the illustrated example, he data 40 may be an integer number that is unique for each pair of matching records in the two databases 12, 14.

In step 200, once the data 40 is copied and pasted, if the user is done reconciling records, the user, in step 210, closes the first database 12. If the user is not done reconciling records, the user may return to step 120 and select another record from the first database 12.

If the user does not find a matching record in the sets of suggested matching records, the user may proceed to step 220 wherein a manual search for a matching record is performed. The user may begin performing a manual search by clicking on the "Manual Find" icon 38 in the first user interface 30. Pressing the "Manual Find" icon 38 causes display of a second user interface 70, such as the interface depicted in FIG. 5, through which a manual search for a matching record in the second database 14 may be performed.

In the second user interface 70, the fields 26 of the second database 14 that may be searched are displayed together in the upper portion of the interface 70 (e.g., the "Phone," "Company," "Feature," "SurrArea," and "Heading" fields 26). The second user interface 70 also includes "Find", "Found" and "Back" icons 74, 76, 78. A search is performed by inputting query terms in one or more of the displayed fields 26. For example, the user may enter all or part of the name of a company in the "Company" field 26. Once query terms are entered in one or more fields 26, the user may initiate execution of the manual search by, for example, pressing the "enter" key on the input device 20. If there are any records in the second database 14 meeting the entered search terms, such records are displayed one at a time. Preferably, all of the data fields 26 are displayed to assist the user in identifying a record matching the selected record 50. The number records found in the second database 14 meeting query terms entered by the user may be displayed below a navigation icon 80 in the upper left portion of the second user interface 70. If no records are found in the second database 14 meeting the entered query terms, a message indicating such condition (e.g. "No records match this request") may be displayed. The user may then be given the option of modifying the manual search, continuing, or canceling the manual search. If the user chooses to modify their search, they may enter revised query terms and then press the "enter" key to execute the manual search using the revised query terms. Choosing to continue causes the last record found to be displayed. Choosing to cancel aborts the manual search and returns the user to the first user interface 30. Also, if it is necessary to abort execution of the manual search, a "Cancel" icon may be displayed on the left portion of the second user interface 70. If the "Cancel" icon appears, the user may click it to abort the manual search and return to the first user interface 30. If the "Cancel" icon does not appear, the user may click on the "Back" icon to abort the manual search and return to the first user interface 30.

In step 230, the user reviews the records found, if any, in the manual search. The user may navigate through the found records by pressing the lower portion 80A of the navigation icon 80 to move to the next record or pressing the upper portion 80B of the navigation icon 80 to move to the previous record. In step 240, if a record matching the selected record 50 is found, the user presses the "Back" icon 78 which causes display of the first user interface 30 and execution of step 180, wherein data from a predetermined field of the matching record is copied to the temporary data buffer. The user then presses the "Found" icon 44 on the first user interface 30 to paste the copied data into the predetermined field of the selected record 50.

If no matching records are found in step 240, in step 250, the user has the option of performing another manual search. The user may perform another manual search by pressing the "Find" icon 74. This resets the manual search and returns the user to step 220 where they may enter new manual search query terms. After completing one or more manual searches without locating a matching record in the second database 14, the user, in step 260 may choose to return to step 120 and continue reconciling records by clicking on the "Back" icon 78, or the user may proceed to step 210 and close the first database 12.

The foregoing description of the present invention has been provided for purposes of illustration and description. This description is not intended to limit the invention and various modalities thereof. Variations, embodiments and modifications may be apparent to those skilled in the art and are intended to be within the scope of the following claims.

What is claimed is:

1. A method for use in reconciling database records comprising the steps of:

accessing an identified first record to reconcile with a plurality of second records, the first record including data within a plurality of first data fields and the second records including data within a plurality of second data fields;

identifying a predetermined number of query fields comprised of first data fields;

identifying a predetermined number of search fields comprised of second data fields, wherein the number of search fields and query fields is the same and each search field corresponds with a separate query field;

performing a search of the second records for records that are possible matches for the first record by comparing data within progressively smaller sets of the query fields to data within corresponding progressively smaller sets of the search fields, wherein, for each corresponding query and search field set, said searching step generates a set of suggested matching records comprised of the second records wherein the data within each search field matches the data within each corresponding query field; and reconciling the first record with one of the suggested matching records identified as matching the first record by copying data from a predetermined data field of the record identified as matching the first record to a predetermined data field of the first record.

2. The method of claim 1 wherein said step of accessing an identified first record includes the step of:

receiving an input wherein the identified first record is selected from a plurality of first records.

3. The method of claim 2 further comprising the step of:

storing the plurality of first records in a first database and the plurality of second records in a second database.

4. The method of claim 2 further comprising the step of:

storing the plurality of first records and the plurality of second records in separate tables within the same database.

5. The method of claim 1 wherein said step of searching is implemented using computer processing apparatus.

6. The method of claim 1 further comprising the steps of:

displaying the first record and the sets of suggested matching records together on a first interface wherein the sets of suggested matching records are reviewable to determine whether one of the records in the sets of suggested matching records matches the first record.

7. The method of claim 6 further comprising the steps of:

receiving an input identifying a record from the sets of suggested matching records that matches the first record.

8. The method of claim 6 further comprising:

upon receiving an input indicating that no records matching the first record are included within the sets of suggested matching records, displaying a second interface wherein a manual search for records in the second database that match the first record may be performed using at least one user specified query term.

9. The method of claim 1 wherein in said step of performing a search, with M representing a positive integer, N representing a positive integer less than M, O representing a positive integer less than N, and P representing a positive integer less than O, data within first, second, third, and fourth query field sets comprised of M, N, O, and P query fields, respectively, are compared to data within first, second, third, and fourth search field sets comprised of M, N, O, and P search fields, respectively.

10. The method of claim 9 wherein M is 4, N is 3, O is 2 and P is 1.

11. A database reconciliation system comprising:

a first record having data within a plurality of first data fields;

a plurality of second records having data within a plurality of second data fields;

a predetermined number of query fields comprised of first data fields;

a predetermined number of search fields comprised of second data fields, wherein said number of search fields and query fields is the same and each search field corresponds to a separate query field; and a processing apparatus, capable of accessing said first record and said second records, which provides for searching of said second records for records that are possible matches for said first record by comparing data within progressively smaller sets of said query fields to data within corresponding progressively smaller sets of said search fields, wherein, for each corresponding set of query and search fields, sets of suggested matching records are generated comprised of said second records wherein said data within each search field matches said data within each corresponding query field;

said processing apparatus being operable to reconcile said first record with one of said suggested matching records identified as matching said first record by copying data from a predetermined data field of said record identified as matching said first record to a predetermined data field of said first record.

12. The system of claim 11 wherein said first record is one of a plurality of first records and said processing apparatus further provides for selection of said first record from said plurality of first records based upon an input from a user of said system.

13. The system of claim 12 wherein said plurality of first records comprise a first database and said plurality of second records comprise a second database.

14. The system of claim 13 wherein said plurality of first records comprise a first table within a database and said plurality of second records comprise a second table within said database.

15. The system of claim 11 wherein said processing apparatus comprises a computer.

16. The system of claim 11 wherein said processing apparatus further provides for display of said first record and said sets of suggested matching records together on a first interface such that a user of said system may compare records within said sets of suggested matching records with said first record to determine whether one of said records within said sets of suggested matching records matches said first record.

17. The system of claim 16 wherein said processing apparatus provides for display of data within a number of predetermined data fields for each said suggested matching record, the number of predetermined data fields being less than the total number of said plurality of second data fields.

18. The system of claim 16 wherein said processing apparatus further provides for receiving an input from a user of said system identifying a record in said sets of suggested matching records that matches said first record.

19. The system of claim 16 wherein said processing apparatus further provides for receiving an input from a user of said system indicating that the user has not identified a record within said sets of suggested matching records that matches said first record and, upon receiving such an input, executing a manual search for records in said second plurality of records that match said first record using at least one query term input by the user.

20. The system of claim 11 wherein, with M representing a positive integer, N representing a positive integer less than M, O representing a positive integer less than N, and P representing a positive integer less than O, said processing apparatus provides for searching of said second records for records that are possible matches for said first record by comparing data within first, second, third, and fourth query field sets comprised of M, N, O, and P query fields, respectively, to data within first, second, third, and fourth search field sets comprised of M, N, O, and P search fields, respectively.

21. The system of claim 20 wherein M is 4, N is 3, O is 2 and P is 1.

* * * * *